Patented July 14, 1931

1,814,344

UNITED STATES PATENT OFFICE

WALTER O. SNELLING, OF ALLENTOWN, PENNSYLVANIA

REDUCTION OF YELLOWING OF MATERIALS WITH AGE

No Drawing.   Application filed April 11, 1930. Serial No. 443,617.

My invention relates to improved means for preventing the discoloration of objects as a result of age and exposure to light and other atmsopheric agencies, and more particularly my invention relates to improved means of preventing the yellowing with time of paper, cloth and other materials.

The "yellowing" with time of white or light-colored objects composed wholly or in large part of cellulose nitrate, cellulose acetate, natural ivory, casein, etc. is well known, and the tendency of paper, silk, cotton, woolen and linen cloth and many other objects to acquire a yellow tint with age is a factor of great commercial importance in connection with the salability of such products. My invention has as its principal object the providing of means of which such "yellowing" of materials with age may be either eliminated or so greatly reduced as to give to the objects a much longer commercial life than would normally exist.

Recognition of the fact that a pure white color is more pleasing in objects such as paper, cloth, sugar and the like, has long led to the correction of a slight normal yellow color, by the addition to the materials of a dye or coloring material of complementary nature. Thus, for example, the housewife and commercial laundries add "bluing" to the wash, and the effect of the slight blue color so applied to the goods is to neutralize the slight yellow color that would otherwise be present. In the manufacture of sugar recognition of the fact that the public demands a pure white color has also resulted in the addition of a blue coloring matter to refined sugar in the process of manufacture, and in many other industries it has also been found advantageous to employ blue coloring materials for the purpose of neutralizing or correcting the normal slight yellow color of natural objects, and obtaining the clear or "full" white color that is commercially advantageous.

My invention does not relate to the correction of the normal yellow color of objects or materials by the addition of a blue coloring matter, this having long been known. My invention relates to means for prolonging the period of time during which cellulosic and other materials remain white in the presence of light and other natural agencies.

In the manufacture of paper, for example, a permanent pure white color is very desirable. Pure cellulose is white, but there are many natural impurities associated with cellulose, all of which tend to become yellow with time. Accordingly, unless paper is made from exceptionally pure cellulose, it shows a very pronounced tendency to acquire a yellow color that increases with time. Newsprint paper, which is made from relatively impure cellulose, becomes quite yellow after only a few years, but even relatively high grade paper-stock is not free from this tendency. Fine linen cloth, high grade cotton cloth, and many other materials and objects composed of cellulose, casein, and like materials show this tendency, and the market value of these materials is accordingly influenced by age, material which has become "off color" or "yellow", as a result of age being much less desired than materials which preserve a pure white color.

Although in the manufacture of goods which tend to become yellow with age it is customary to correct any residual normal yellow color by the use of bluing or like coloring material, it will be noted that this is an initial effect only, and does not and cannot correct the tendency which later develops for these materials to become yellow with age. Thus, paper which has been brought to a "pure white" by the addition of a blue coloring matter at the time of manufacture, later develops a pronounced yellow tinge, as a result of chemical reactions brought about by exposure to light and atmospheric agencies. Where objects or materials are bleached, to obtain "whiteness" at the time of manufacture, the effect of the bleach is rarely permanent, and with these objects also there is a tendency to acquire a yellow color with time. Straw as used in the manufacture of straw hats, for example, is a very good illustration of deterioration or "yellowing" of a bleached material with time.

I have discovered that by adding to a material which normally becomes yellow with time a fugitive yellow dye that tends to lose its color at approximately the same rate that the object or material tends to acquire a yellow color as the result of exposure to atmospheric agencies, and then correcting or neutralizing both the normal yellow color of the material and the added yellow color of the treating agent by the use of a suitable amount of blue coloring material, I can materially add to the effective economic life of the material. By using a fugitive yellow dye of relatively short life, together with a "permanent" blue dye of relatively long life, I counteract the yellowing tendency of impurities in the material by the tendency of the added yellow dye to fade, while correcting both the normal yellow color of the material and the yellow color of the added yellow dye by the use of a blue coloring material to the extent of approximately double the amount that would normally be used.

As an example of my present invention, I will describe the method which I prefer to use in the preparation of a high grade writing or book paper composed of cellulose of good quality, of such grade that from two to ten pounds of ultramarine blue to each ton of paper would be normally used by present methods of manufacture for the correction of the natural yellow tint of the paper stock. Instead of using from two to ten pounds of ultramarine blue per ton of paper to correct the initial yellow color, I prefer to add to each ton of my paper stock approximately double this quantity of ultramarine blue, this resulting in giving the stock a noticeable blue tint. To the blue stock I next add a fugitive yellow dye such as thioflavine S, chrysophenine, direct yellow S, pontamine yellow CH, flavine S, or the like, until the blue color resulting from the excess of blue coloring material has been neutralized. This gives a very slight greenish tinge, which I next correct by the addition of a small amount of any suitable red coloring material such as Congo red, magenta, diamine red, thiogene red or alizarin red.

It will be noted that by employing a permanent blue coloring material, a permanent red coloring material, and a fugitive yellow coloring material, I obtain a resulting white which has the unique property of remaining white over a long period of time, even when the paper is exposed to atmospheric agencies having a yellowing effect. With time, as the impurities in the paper stock turn yellow, the added fugitive yellow dye tends to bleach and become colorless, and as sufficient permanent blue and permanent red are present to neutralize the composite yellow effect from both yellow factors, I obtain a product which retains its white color for a much longer time than is possible by the application of present methods involving only the initial correction of the original yellow color.

Although I have described my invention with particular reference to the manufacture of paper, it will be recognized that my invention is broadly applicable to the treatment of many other materials. In the manufacture of white cloth of linen, cotton or wool, my invention may be readily applied to the production of fabric that will withstand storage for a much longer period of time without yellowing than corresponding fabrics made by methods at present known. In the preparation of products such as photographic film and motion picture film, from nitrocellulose or cellulose acetate or equivalent materials, my invention may also be applied to great advantage, the tendency of these materials to become yellow being a very serious economic disadvantage. In the preparation of transparent products such as the pyroxylin sheeting used in the manufacture of triplex or "non-shatterable" glass, my invention also shows pronounced advantage over present methods and in general my invention is applicable in the treatment of objects of cellulose or its products, as well as such other materials as sugar, natural ivory, flour, straw, casein and its products, and many other commercial materials that are either white or light-colored.

It will be noted that in these specifications I have referred to motion picture film, which is usually referred to as "colorless", and to paper, which is usually referred to as "white", as though these two terms were interchangeable. This is because colorless materials and white materials behave similarly, in the practice of my invention. White, in a physical sense, is absence of color, and "colorless", similarly connotes absence of color. Materials which are opaque and colorless are usually referred to as white, and materials which are transparent and colorless are usually simply designated as "colorless". In the application of my invention, however, both transparent and opaque materials behave similarly, and accordingly I desire to include colorless materials with white materials in the consideration of the process as herein disclosed, and in the claims.

Although blue pigments such as Prussian blue and ultramarine blue are satisfactory for the practice of my invention in connection with the manufacture of paper, the insoluble nature of these two materials does not permit of their use in the treatment of relatively impervious solid materials, and for the treatment of such materials I prefer to employ a vat dye such as indanthrine blue R. S., and ponsol blue R. S. These dyes may also be used in the treatment of paper, cloth, etc. in exactly the same manner as I have described for the use of ultramarine blue. Employing indanthrine blue R. S. in paper manufacture, I find it desirable to use a much smaller quantity of the coloring material, because of its much greater coloring intensity, thus, for example, instead of using sixteen pounds of ultramarine blue per ton of paper I may use as little as two or three pounds of indanthrine blue R. S., with from one-tenth ounce to one-half ounce of a correcting red dye, and sufficient fugitive yellow to give the desired initial white. As already described, this initial white tends to remain permanent for the reason that the added fugitive yellow dye tends to bleach as a yellow color develops in the material as a result of exposure to atmospheric agencies.

There is a wide difference among commercial dyes in their "fastness" to light and atmospheric agencies. Pure yellow S, for example is a quite fugitive yellow, bleaching quite rapidly. Chrysophenine is relatively more permanent. Thiazole yellow 2 G M Conc., brilliant pure yellow 6 G extra P, dianil yellow 5 G and toluylene yellow G are fugitive, in the order named, thiazole yellow 2 G M Conc. fading out rapidly, and toluylene yellow G being the last to bleach of this set of four fugitive yellows. Many other fugitive yellows are also commercially available, and the relative "fastness" of commercial dyes may be readily tested in a few hours by experimental dyeings and exposure to ultra violet light. It should of course be remembered that the tendency of materials to "yellow" with time is influenced not alone by light but also by oxidation by contact with atmospheric oxygen, and particularly as the result of atmospheric moisture or humidity. Accordingly, the amount and the nature of the fugitive yellow to be employed in the treatment of any particular material will be influenced to some extent by both the nature of the material and the storage conditions to which it will be subjected. In the treatment of book paper, for example, I find it desirable to examine books which have been stored under normal conditions for several years, and to add to a paper batch of similar composition to that used in their manufacture an amount of a fugitive yellow which will just match the color of the paper after such storage, a yellow dye being preferably used whose fading characteristics corresponds to the period of storage.

It should be noted that one of the valuable features of my invention is the ability which it gives to the manufacturer of paper products and like materials to produce a product equal to present grades at a reduced cost of manufacture. In the purification of paper pulp, for example, 95% of the material which yellows readily may be removed in relatively cheap purification treatments, but the small remaining amount of impurities which yellow with age can be removed only at a cost greatly disproportionate to the cost of the removal of the first 95% of ligneous and other impurities. If it is the object of the manufacturer to produce paper equivalent in keeping power to paper of present manufacture rather than the obtaining of a superior product by the methods herein described, it is possible to eliminate a portion of the present purification treatment and thereby effect a material saving in manufacturing costs, as the application of the herein-described process enables the yellowing of the retained impurities to be corrected and a paper of satisfactory grade to be obtained at considerably reduced cost. In practice, I find it desirable to select as my fugitive yellow correcting agent a dye which normally bleaches or becomes colorless at approximately the rate and under approximately the same circumstances that cause the appearance of a yellow color in the particular material to be treated, so that the yellow color of the material itself, plus the yellow color of my fugitive yellow dye, will always be a constant. As has already been described, the yellow color, representing the composite effect of the yellow color of the material as a result of exposure to atmospheric agencies, and the yellow color due to the added fugitive yellow color is completely neutralized in the finished material by the addition of a suitable amount of a permanent blue coloring material and a correcting red coloring material to suitably adjust the slight greenish tinge resulting from the first adjustment.

As many modifications may be made without departing from the principles of my invention as herein described, no limitations of my invention should be made except as indicated in the appended claims.

I claim:

1. The process of compensating for yellowing which comprises tinting a light-colored material with a permanent blue and a fugitive yellow, each in amount insufficient to impair the desired light color of the material.

2. The process of compensating for change of color with time which comprises tinting a white object with a relatively permanent blue, a relatively permanent red, and a fugitive yellow, each in amount insufficient to impair the desired white color of the object.

3. The process of compensating for yellowing from exposure to atmospheric agencies which comprises tinting a material with a fugitive yellow and adding relatively permanent complementary coloring material until whiteness is obtained.

4. A white object tinted with a relatively permanent blue and a fugitive yellow, each in amount insufficient to impart its own color to the object.

5. A white object tinted with a relatively permanent blue, a relatively permanent red, and a fugitive yellow, each in amount sufficient in combination to produce whiteness.

6. A white cellulosic product tinted with a permanent blue and a fugitive yellow but remaining substantially white after such treatment.

7. Paper tinted with a relatively permanent blue and a fugitive yellow, each in amount insufficient to impart color to the paper when used in combination.

8. Paper tinted with a relatively permanent blue and a relatively permanent red and a fugitive yellow, each in amount insufficient to impart color to the paper when used in combination.

In testimony whereof, I have hereunto subscribed my name this 10th day of April, 1930.

WALTER O. SNELLING.